(12) United States Patent
Brown

(10) Patent No.: US 8,984,735 B2
(45) Date of Patent: Mar. 24, 2015

(54) DESK-MOUNTED RETAINER DEVICE FOR PORTABLE SHEET CLAMPS

(76) Inventor: Scott Brown, Peachtree City, GA (US)

( * ) Notice: Subject to any disclaimer, the term of this patent is extended or adjusted under 35 U.S.C. 154(b) by 339 days.

(21) Appl. No.: 13/453,060

(22) Filed: Apr. 23, 2012

(65) Prior Publication Data

US 2013/0276282 A1 Oct. 24, 2013

(51) Int. Cl.
| B23P 11/00 | (2006.01) |
| B42F 1/00 | (2006.01) |
| F16M 13/02 | (2006.01) |

(52) U.S. Cl.
CPC ......... *F16M 13/022* (2013.01); *Y10T 29/49778* (2013.01)
USPC ........... 29/525.01; 24/457; 24/455; 24/67.11; 248/205.1; 248/225.11; 248/226.11; 248/316.1; 248/316.7

(58) Field of Classification Search
CPC ............ B42F 1/006; B42F 9/00; B42F 9/008; B42F 9/002; B42F 15/06; B42F 15/066; A47F 7/163; A47B 21/045; B42D 5/006; G09F 1/10
USPC .............. 24/67.1, 67.7, 67.11, 455, 457, 460; 248/205.1, 207, 225.11, 226.11, 316.1, 248/316.7, 316.8; 29/525.01; 281/44, 45
See application file for complete search history.

(56) References Cited

U.S. PATENT DOCUMENTS

| 335,503 | A | * | 2/1886 | Butler | 362/419 |
| 1,911,277 | A | * | 5/1933 | Helmer | 24/67.1 |
| 2,226,454 | A | * | 12/1940 | Walters | 281/51 |
| 2,985,174 | A | * | 5/1961 | Guth | 24/67.1 |
| 2,990,961 | A | * | 7/1961 | Schneider | 211/48 |
| 3,001,748 | A | * | 9/1961 | Austin | 248/468 |
| 3,069,737 | A | * | 12/1962 | Schneider et al. | 24/67.1 |
| 3,221,892 | A | * | 12/1965 | Morcheles et al. | 211/48 |
| 3,262,666 | A | * | 7/1966 | Solum | 248/231.71 |
| 3,308,831 | A | * | 3/1967 | Kritske | 24/67.1 |
| 3,364,528 | A | * | 1/1968 | Fletcher | 24/67.1 |
| 3,891,093 | A | * | 6/1975 | Petrie | 211/46 |
| 3,896,526 | A | * | 7/1975 | Joiner | 24/67.1 |
| 3,947,138 | A | * | 3/1976 | Eshelman | 402/69 |
| 4,594,754 | A | * | 6/1986 | Spicer | 24/536 |
| 4,623,276 | A | | 11/1986 | Kinneir | |
| 4,657,163 | A | * | 4/1987 | Cats | 225/106 |
| 4,836,389 | A | * | 6/1989 | Poulton | 211/45 |
| 4,844,644 | A | | 7/1989 | Roberts | |
| 4,921,506 | A | * | 5/1990 | Poulton | 24/67.1 |
| 5,285,556 | A | * | 2/1994 | Shorin et al. | 24/487 |

(Continued)

FOREIGN PATENT DOCUMENTS

| GB | 11789917 | | 1/1970 | | |
| GB | 2084007 | A * | 4/1982 | | A47B 19/00 |

*Primary Examiner* — Essama Omgba
(74) *Attorney, Agent, or Firm* — J. T. Hollin Attorney at Law, P.C.

(57) ABSTRACT

The inventive concept is a device which is used to secure a sheath or stack of papers contained in an architectural sheet rack clamp. The device is essentially a three-tiered rectangular structure forming two parallel, length-wise channels within the spaces defined by the three tiers. One channel, situated as the upper clamp retaining channel, is structured so as to securely accommodate the typical sheet clamp used to store such materials as architectural drawings, maps, and other similar over-sized sheets. The second, or lower desk anchoring, channel of the device, contains two adjustable fastening means, enabling attachment of the lower desk anchoring channel to a desk, draftsman's stand, or table.

5 Claims, 4 Drawing Sheets

(56) References Cited

U.S. PATENT DOCUMENTS

| | | | |
|---|---|---|---|
| 5,509,745 A | 4/1996 | Hegarty | |
| 5,582,376 A * | 12/1996 | Thompson | 248/214 |
| 5,910,351 A * | 6/1999 | Davis et al. | 428/100 |
| 5,967,689 A | 10/1999 | Fleischauer | |
| 6,302,362 B1 * | 10/2001 | Moore | 248/73 |
| 6,431,360 B1 * | 8/2002 | Julius | 206/494 |
| 6,453,518 B1 * | 9/2002 | Adams et al. | 24/67.9 |
| 6,862,780 B2 * | 3/2005 | Henry | 24/536 |
| 7,159,832 B2 * | 1/2007 | Easterling | 248/316.6 |
| 7,600,722 B2 * | 10/2009 | Yang | 248/65 |
| 8,251,329 B2 * | 8/2012 | Suciu et al. | 248/316.2 |
| 2002/0047079 A1 * | 4/2002 | Gerson | 248/339 |
| 2003/0024892 A1 | 2/2003 | Macsenti | |
| 2003/0152418 A1 | 8/2003 | Dugmore | |
| 2004/0065785 A1 * | 4/2004 | Miura et al. | 248/62 |
| 2004/0083580 A1 * | 5/2004 | Gerson | 24/3.11 |
| 2010/0050399 A1 * | 3/2010 | Browne et al. | 24/455 |

\* cited by examiner

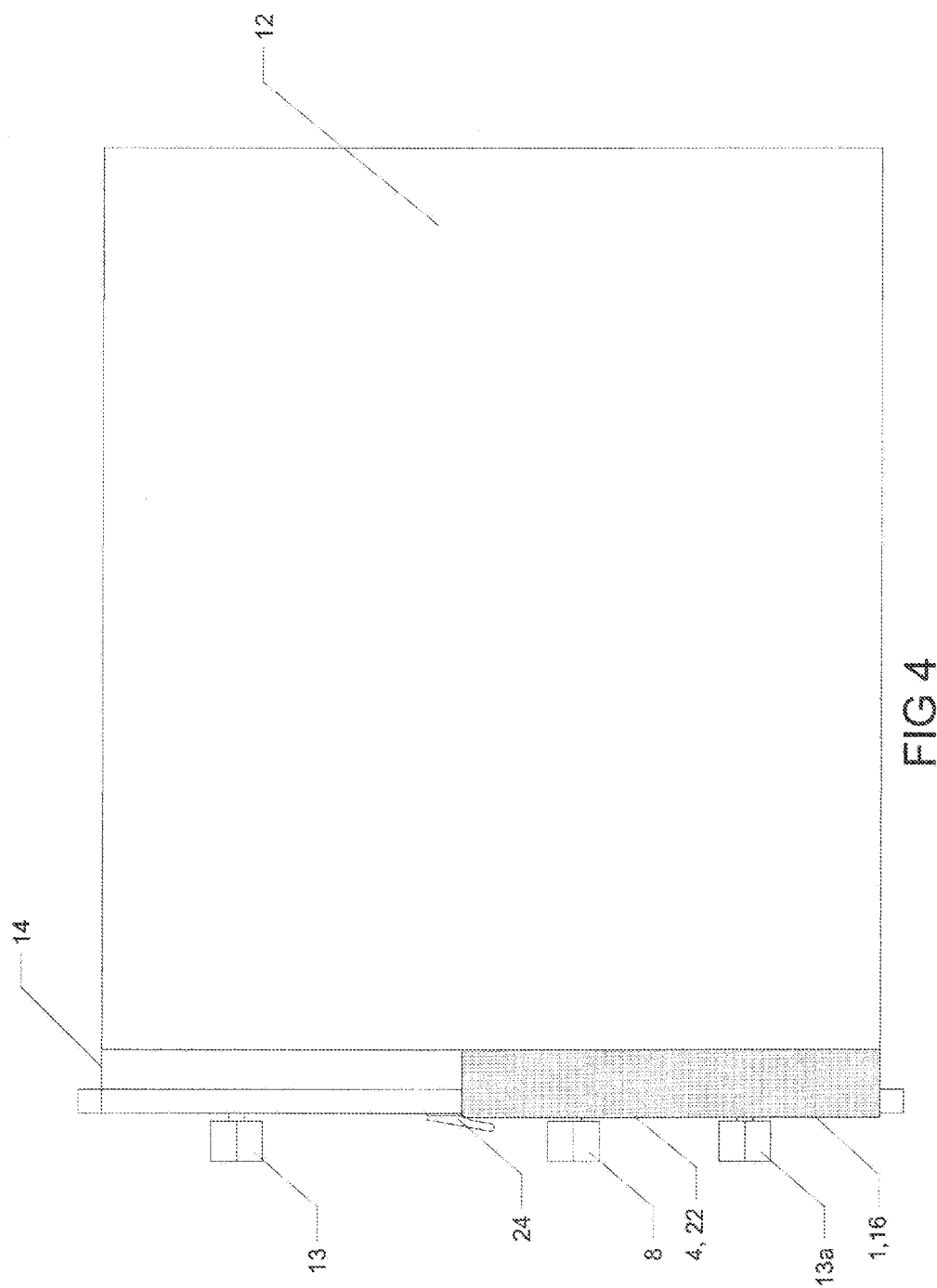

DESK-MOUNTED RETAINER DEVICE FOR PORTABLE SHEET CLAMPS

REFERENCE TO RELATED APPLICATION

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION (1) Field of the Invention

The inventive concepts presented herein generally are concerned with devices and methods for securing, to a desk or worktable, racks or clamps containing multiple large sheets of architectural plans, drawings, maps, and other similar oversized items. In architectural, engineering, and construction firms around the world it is not uncommon to find assemblages of large sheets of drawings or blueprints suspended by a longitudinal clamp, the sheets generally hanging in a vertical orientation. Should a user need to refer or edit such sheets of drawings, it is oftentimes difficult to place the clamp containing the assembled sheets upon the professional's desk such that he/she may easily manipulate individual sheets.

The inventive concept herein discloses an easy-to-use sheet clamp retainer device for use with blueprints, maps, charts, and similar over-sized papers or materials.

(2) Description of the Related Art

There is a scarcity of prior art devices which perform the same function as disclosed herein. In a British patent application, GB 1178917 (Frank, et al, 1970), there is shown a loose leaf binder which may be mounted on a desk. The binder may, by the use of spring-loaded plates, retain a substantial number of sheets. The device is also inclined so as to facilitate its use as a reading table.

In U.S. Pat. No. 4,623,276 (Kinneir, 1986), the inventor reveals a portable lectern comprising means for releasably holding a plurality of sheet members of paper or the like. The base member of the lectern includes a generally planar base member configured and dimensioned for standing in a stable manner on a relatively flat surface. A portion of the device comprises a channel for contacting a marginal portion of the sheet member retaining means to maintain it at a predetermined slightly inclined or generally vertical orientation.

A calendar pad stand is disclosed in U.S. Pat. No. 4,844,644 (Roberts 1988) wherein the device comprises an inclined work surface and a support for incliningly supporting the work surface from a desk, table, or other horizontal resting surface.

In U.S. Pat. No. 5,509,745 (Hagarty, 1996) presents a lockable document support device, and more particularly a stationary document support stand having a selection of interchangeable document holders which includes a lockable document retaining capability that can be selectively and securely interlocked with the stationary stand while supporting documents in one or more viewing dispositions.

U.S. Patent application publication 2003/0152418 (Dugmore, 2003) is concerned with a transfer device for sheets of material filed in a folder, the transfer device including a base member having a longitudinal axis and a pair of flexible, elongate, transfer members arranged on the base member. The sheets may be stored in the device or they may be extended transversely relative to the base member for operational use.

BRIEF SUMMARY OF THE INVENTIVE CONCEPT

The desk mounted retainer device herein is an apparatus that a draftsman or other professional person who handles oversized single sheets or sheaths of material would use in conjunction with any of the standard hanging sheet clamps that are now commercially available. Such hanging sheet clamps are portable, and typically hold a quantity of large sheets or plans by a grasping means. The disclosed inventive concept essentially comprises a parallel upper and lower channels, the upper channel for affixation to a typical hanging sheet clamp, while the lower channel provides a fastening means for sturdy connection to a desk or table. The disclosed device allows a user to remove the sheet clamp, which may be suspended from a rack holding several similar clamps. The user thereupon inserts the clamp containing a stack of sheets or plans directly into the upper channel of the device. The device has a retention means for securing it to a desk or drafting table of the user. The sheets or plans are then easily and comfortably manipulated, sheet by sheet, as the user's work needs dictate.

BRIEF DESCRIPTION OF THE VIEWS OF THE DRAWINGS

The objects, features, and advantages of the concept presented in this application are more readily understood when referring to the accompanying drawings. The drawings, totaling four figures, show the basic functions of the desk-mounted sheet retaining device. In the several figures, like reference numbers are used in each figure to correspond to the same component as may be depicted in other figures.

FIG. 4 depicts the device attached to a typical portable architectural sheet clamp that is normally suspended from a special wall or floor-mounted rack.

---

Index to Nomenclature for Inventive Concept

Figure 1:
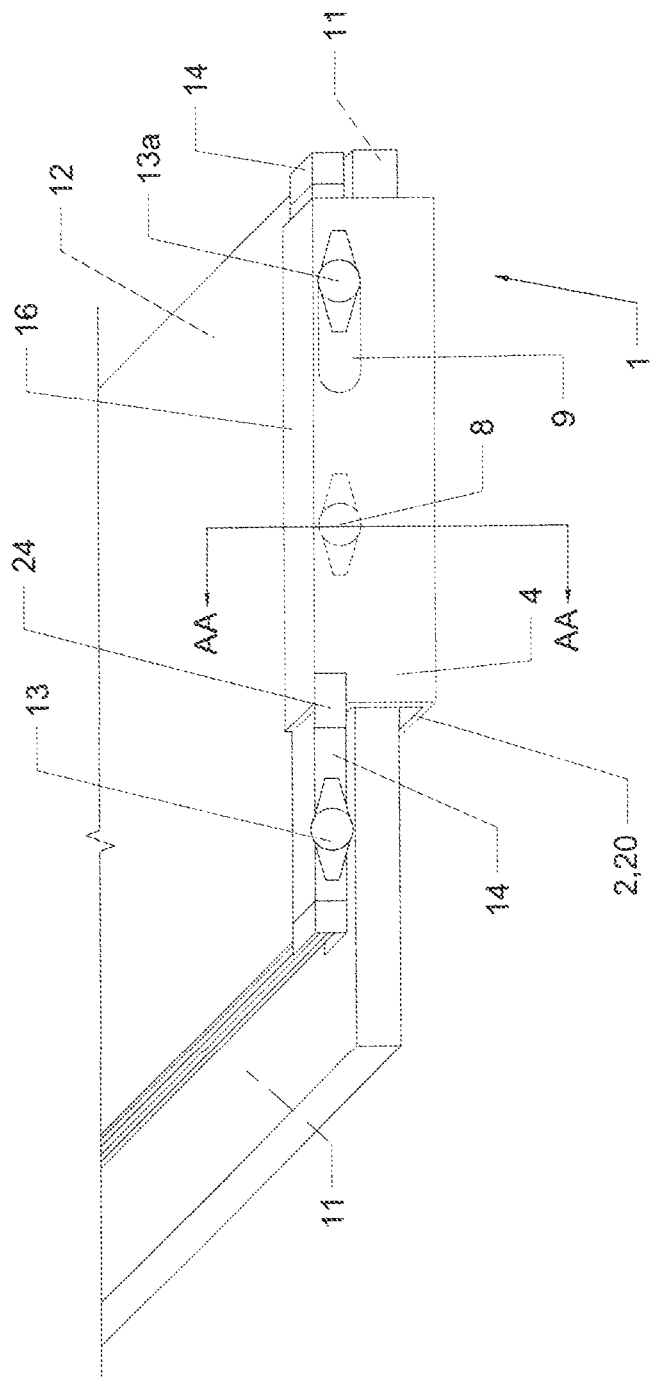
FIG. 1 is a view, in perspective, of the device attached to a desk or table top, with the upper channel of the device clutching a quantity of oversized sheets.

1. Retainer device
2. Clamp retaining channel
3. Desk anchoring channel
4. Retainer back plate
5. Threaded bolt
6. Non-slip pad
7. T-handle
8. Lockscrew
9. Acceptor slot
10. Flexible grippers
11. Table/desktop
12. Oversize sheets
13. Topmost sheet clamp screw
13a Lowermost sheet clamp screw Index to Nomenclature for Inventive Concept 14. Portable sheet clamp
15. Inner surface of back plate
16. Upper surface of top plate
17. Lower surface of top plate
18. Top surface of middle plate
19. Lower surface of middle plate
20. Top surface of Bottom plate
21. Lower surface of bottom plate
22. Outer surface of back plate
23. Inner surface of back plate
24. Sheet clamp catch

DETAILED DESCRIPTION OF THE INVENTIVE CONCEPT

In referring to FIG. 1, a general understanding of the overall operation of the disclosed retainer device 1 can be provided. A stack of over-sized sheets 12 is depicted within the spring-loaded grasp of a portable sheet clamp 14. Typically, the portable sheet clamp 14, has been removed from a larger storage mechanism containing a rack of such sheet clamps 14. A table or desktop 11 is seen from the front end, or a position opposite the user's work-side of such table/desktop 11. The back plate 4 of the retainer device 1 is prominently shown, along with portions of the top surface of the bottom plate 20, the top surface of the middle plate 19, and the entire length of the upper surface of the top plate 16. The desk anchoring channel 3 is firmly secured to the table/desktop 11 by means of a plurality of machine-threaded screws 5, (not shown in FIG. 1) which are inserted simultaneously through the bottom surface of the bottom plate 20, and the top surface of the bottom plate 21.

In FIG. 1, the portable sheet clamp 14 is depicted secured within the clamp retaining channel 2 of the retainer device 1. An uppermost sheet clamp screw 13 and a lowermost sheet clamp screw 13a, both being integral to the portable sheet clamp 14, are shown. The typical portable sheet clamp 14 is also constructed with an L-shaped catch 24 which is capable of encompassing the retainer back plate 4 by sliding the portable sheet clamp 14 in a left-right direction, until frictional force provides a retaining grip upon the retainer back plate 4. as seen from FIG. 1. The retainer device 1 is constructed with a lockscrew 8, which travels through a threaded hole in the retainer back plate 4 and is used to further secure the portable sheet clamp 14 within the clamp retaining channel 2. Also shown is an acceptor slot 9, used to accommodate the lowermost sheet clamp screw 13a.

Figure 2:
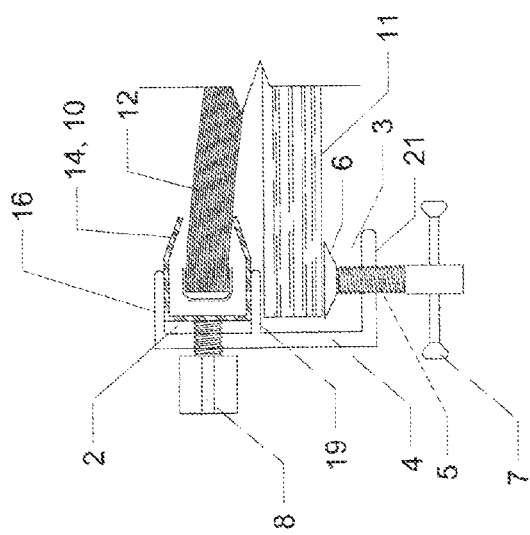
FIG. 2 presents a cross-sectional view of an embodiment of the device, as seen from section line AA-AA depicting the clasping means accomplished by the upper and lower channels of the device.

As we view FIG. 2, there is presented a cross-section display, as taken along the cutaway line AA-AA of FIG. 1. A portable sheet clamp 14, containing a sheath of over-sized papers 12, is shown secured within the clamp retaining channel 2 of the device. The lockscrew 8 has been rotated a sufficient number of turns so that it abuts the portable sheet clamp 14, thereby stabilizing the securement provided by the sheet clamp catch 24 (out of view in FIG. 2). The desk anchoring channel 3 encompasses the table/desktop 11 and the threaded bolt 5 and non-slip pad 6 are tightened by means of a T-handle 7 to firmly engage the desk anchoring channel 3 with the table/desktop 11. At this juncture, the oversize sheets 12 lay essentially flat upon the surface of the table/desktop 11. The retainer device 1 provides the convenience and stability for a user to turn individual pages of the sheath of oversize sheets 12 to work upon each page as necessary.

Figure 3:
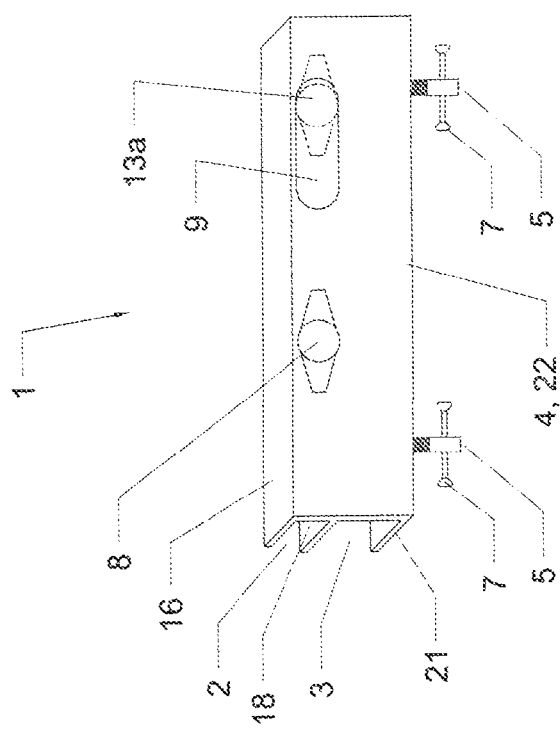
FIG. 3 shows a perspective view of the device, while not in operational use, looking toward the back of the device.

FIG. 3 is an illustration of a perspective view of the retainer device 1 as seen from the rear of the device, and looking directly at the retainer back plate 4. Both the clamp retaining channel 2 and desk anchoring channel 3 are shown, as well as the two threaded bolts 5. The lockscrew 8 and the acceptor slot 9 are depicted, including a simulated presentation, by dashed lines, of the approximate location wherein the lowermost sheet clamp screw 13a of a portable sheet clamp 14 would fit into the acceptor slot 9.

Shown in FIG. 4 is a top view of the upper surface 16 of a retainer device 1 as it is actively holding a portable sheet clamp 14 in place. Depicted are the location of the two sheet clamp screws 13 and 13a, the oversize sheets 12 normally clutched within the portable sheet clamp 14, and the L-shaped sheet clamp catch 24. The sheet clamp catch 24 usually functions to secure the portable sheet clamp 14 to the rack upon which the portable sheet clamp 14 is normally suspended when not in use. FIG. 4 illustrates how the sheet clamp catch 24, serves to secure the portable sheet clamp 14 onto the retainer back plate 4 of the retainer device 1 during the time when any or all of the oversize sheets 12 may be required for deskwork.

While preferred embodiments of the present inventive concept have been shown and disclosed herein, it will be obvious to those persons skilled in the art that such embodiments are presented by way of example only and not as a limitation to the scope of the inventive concept. Numerous variations, changes, and substitutions may occur or be suggested to those skilled in the art without departing from the intent, scope, and totality of the inventive concept. Such variations, changes, and substitutions may involve other features which are already known per se and which obviously may be used instead of, or in addition to features already disclosed herein.

What is claimed is:

1. A device for detachably retaining, in a horizontal orientation atop a desk, a portable sheet clamp having an L-shaped catch and containing oversized paper sheets, the device comprising a predominantly orthogonal longitudinal structure having two parallel, U-shaped channels, wherein the first such channel, forming an upper clamp retaining channel, comprises an inner width dimension sufficient to contain the clasping section of commonly used portable sheet clamps, and the second such channel forming a lower desk anchoring channel, comprises an inner width dimension which permits secure fit onto the edge of a worktable or desk, the upper clamp retaining channel further comprising a back plate of a thickness allowing the engagement of the L-shaped catch of said portable sheet clamp and a means for attaching the clamp retaining channel to the portable sheet clamp, and the lower desk retaining channel further comprising at least two means for horizontally fastening said lower desk retaining channel onto said edge of a worktable or desk.

2. A device for detachably retaining, in a horizontal orientation atop a desk, a portable sheet clamp having an L-shaped catch and containing oversized paper sheets, the device comprising a primarily longitudinal unitary structure having
   a rectangular top plate having a top surface and a lower surface;
   a rectangular middle plate having a top surface and a lower surface;
   a rectangular bottom plate having a top surface and a lower surface;
   a rectangular back plate having an outer surface, an inner surface, and of a thickness dimension allowing the engagement of the L-shaped catch of said portable sheet clamp, wherein said top plate, middle plate, and bottom plate are oriented parallel to each other and orthogonally and permanently attached along their lengths, to the inner surface of said back plate, said attachments thereby forming (a) a U-shaped upper clamp retaining channel running lengthwise between said top plate and middle plate and, (b) U-shaped lower desk retaining channel running, lengthwise between said middle plate and bottom plate;

said unitary structure further comprising a plurality of threaded fasteners insertable perpendicularly and vertically upward through correspondingly threaded openings in said bottom plate, a lockscrew insertable perpendicularly through said back plate so as to emerge into said upper clamp retaining channel, and an acceptor slot excised from said back plate for acceptance of a threaded fastener of the type commonly found on portable sheet clamps.

3. A device as in claim 2, wherein said threaded fasteners comprise at least two machine-threaded bolts, each threaded at one end and having an integral T-handle affixed to the opposite end; and said lockscrew comprises a bolt having a threaded structure at one end, and having a gripping surface facilitating grasping by a user's fingers at the opposite end.

4. A method of facilitating the securement and convenient use, in a horizontal orientation atop a desk, table, or drafting stand, a portable sheet clamp having an L-shaped clasp, said clamp being used to retain architectural drawings, maps, and other similar oversized sheet materials, by the steps of:

constructing a predominantly orthogonal longitudinal structure having two parallel, equal-length, U-shaped channels, formed by constructing a rectangular top plate having a top surface and a lower surface;

constructing a rectangular middle plate having a top surface and a lower surface;

constructing a rectangular bottom plate having a top surface and a lower surface;

constructing a rectangular back plate having an outer surface and an inner surface and of a dimension allowing the retention of the L-clasp of said portable sheet clamp;

orienting said top plate, middle plate, and bottom plate parallel to each other and attaching, orthogonally along one length of each of said top, middle, and bottom plates, to the inner surface of said back plate, said attachments thereby forming (a) an upper clamp retaining channel running lengthwise between said top plate and middle plate and, (b) a lower parallel, desk anchoring channel running lengthwise between said middle plate and bottom plate;

wherein the clamp retaining channel comprises an inner width dimension sufficient to contain the clasping section of said portable sheet clamp, and the desk anchoring channel comprises an inner width dimension which permits secure fit onto the edge of a worktable or desk, the clamp retaining channel further comprising a back plate of a thickness allowing the engagement of the L-shaped catch of said portable sheet clamp providing for a plurality of threaded fasteners insertable perpendicularly through said bottom plate, a lockscrew insertable perpendicularly through said back plate, and an open slot excised from said back plate;

attaching, by means of said threaded fasteners, said lower channel to said desk, table, or drafting stand; and attaching, by means of said upper channel and lockscrew, said portable sheet clamp.

5. A method as in claim 4, wherein said threaded fasteners comprise at least two machine-threaded bolts, each threaded at one end and having an integral T-handle affixed to the opposite end; and said lockscrew comprises a bolt having a threaded structure at one end, and having a knurled gripping surface facilitating grasping by a user's fingers at the opposite end.

* * * * *